United States Patent [19]
Avedissian

[11] 3,749,339
[45] July 31, 1973

[54] VIBRATION ISOLATOR MOUNT
[75] Inventor: Michael K. Avedissian, Mohnton, Pa.
[73] Assignee: Western Electric Company, Incorporated, New York, N.Y.
[22] Filed: Oct. 12, 1971
[21] Appl. No.: 188,207

[52] U.S. Cl. .............................. 248/20, 248/358 R
[51] Int. Cl. ........................ F16f 15/08, F16f 11/00
[58] Field of Search .................... 248/20, 358 R, 21, 248/23; 267/118, 122; 188/1 B

[56] References Cited
UNITED STATES PATENTS
| | | | |
|---|---|---|---|
| 3,598,353 | 8/1971 | De Grey | 248/358 R |
| 2,905,449 | 9/1959 | Belk et al. | 267/122 X |
| 3,216,679 | 11/1965 | Curwen | 248/20 |

FOREIGN PATENTS OR APPLICATIONS
| | | | |
|---|---|---|---|
| 680,035 | 10/1952 | Great Britain | 248/20 |
| 1,064,671 | 4/1967 | Great Britain | 248/20 |

Primary Examiner—J. Franklin Foss
Attorney—W. M. Kain, J. B. Hoofnagle, Jr. et al.

[57] ABSTRACT

A vibration isolator mount includes a pair of concentric chambers for confining a fluid medium such as air, with at least the inner chamber being interposed between a base and a load. The load is supported by a piston which is, in turn, supported for vertical movement by a flexible diaphragm affixed to an opening in the upper surface of the inner chamber. The chambers communicate through, and the volumes of air confined within the chambers are coupled by an orifice located in a wall common to both chambers.

When the base or the load is subjected to vibrational displacements, the confined fluid contracts and expands at a very slow rate to store and release vibratory energy and thereby isolate the load from the base. Also, the orifice damps the passage of air between the chambers, dissipating vibratory energy as heat. The load is maintained at a preset equilibrium height by a pair of valves which compensate for changes in the weight of the load by admitting air to or exhausting air from the chambers.

7 Claims, 3 Drawing Figures

VIBRATION ISOLATOR MOUNT

BACKGROUND OF THE INVENTION

1. Field of the Invention

This invention relates to vibration isolator mounts, and more specifically, to a compact, low resonant frequency fluid mount utilizing a pair of chambers and having facilities for maintaining a supported load at a predetermined equilibrium height.

2. Description of the Prior Art

Vibration isolator mounts are frequently used to protect equipment, such as that used in sensitive manufacturing operations, from vibrational displacements in floors and other support surfaces. A vibration isolator mount which is used for this purpose should provide low transmissibility of vibrational energy at the low vibration frequencies the mount is likely to experience. The obtainment of low transmissibility of vibrational energy usually requires that the natural frequency of the vibration isolator mount be very low relative to the disturbing frequency. Thus, to effectively isolate low frequency vibrations the mount should have a very low natural frequency. At the same time, attenuation of higher frequencies is usually improved by lowering the natural frequency.

Another important design consideration is the adaptability of the isolator mount to variations in the weight of the supported load. During the course of a manufacturing operation, the load supported by an isolator mount may vary considerably, reflecting, for example, the process of depositing workpieces on and removing workpieces from a machine supported by the mount, or reflecting a machine operator's use of the mount for support. Ideally, both the isolation performance of the mount and the height at which the load is supported would be unaffected by such variations in the weight of the supported load.

Mechanical coil springs, which have frequently been used for vibration isolation, present several design problems. Although high frequencies are relatively easily attenuated with coil springs, effective attenuation becomes difficult at frequencies below approximately 5 Hertz. At these lower frequencies, the large static deflection necessary to achieve effective attenuation requires a long spring length, and the long spring length may, in turn, necessitate the use of a large coil diameter to prevent buckling. As a result, the size of the spring may render it unsuitable for certain applications, and its mass may cause surges of high transmissibility at frequencies above resonance. This spring surging effect is particularly unfortunate since, as mentioned previously, effective attenuation usually requires that the natural frequency of the vibration isolator mount be slower than the disturbing frequency.

Another difficulty may occur due to the characteristic resonant frequency of a coil spring and the dependence of the resonant frequency on the magnitude of the supported load. To achieve a particular resonant frequency when a single coil spring is used for support, or to achieve a constant system frequency when several springs are utilized, each spring must be selected to carry a predetermined load, that is, to accommodate the load at each point of support. The sensitivity of coil springs to the magnitude of the load may then require changing springs to accommodate significant changes in load magnitude at a support point.

Fluid isolators, isolators which utilize a fluid medium as the spring element, have several advantages over coil spring isolators. Firstly, at low resonant frequencies, fluid isolators are free from spring surging, and may provide even better attenuation of high frequency inputs than do coil spring isolators. Secondly, the resonant frequencies of fluid isolators are, within practical limits, only slightly affected by the magnitude of the load. Fluid isolators are thus relatively unaffected by varying loads in the case of a single isolator support system, or by unequal or varying loads in the case of a multiple support system. At the same time, the performance of fluid isolators can be closely predicted over a wide range of input vibration amplitudes, frequencies, and loads.

A typical vibration isolator fluid mount might include a cylinder for confining a volume of fluid medium such as air, and a piston which is supported by the volume of fluid medium analogously to a mechanical spring-mounted piston, and which, in turn, supports a load such as an operating machine. Low resonant frequencies can then be attained by using a small diameter piston combined with a large volume of air. However, the use of a small diameter piston may necessitate using a cylinder of considerable length in order to satisfy the volume requirement and the height of the mount could then become excessive.

An additional difficulty occurs if the height of the supported load must be kept constant. Although the resonant frequency of such an air mount is relatively independent of the load, changes in the magnitude of the load, which vary the compression of the column of air confined within the cylinder, may change the equilibrium height of the load.

It may be thus appreciated that there exists a need for a low resonant frequency, vibration isolator fluid mount of compact size which is capable of maintaining a varying load at a constant equilibrium height.

SUMMARY OF THE INVENTION

It is an object of this invention to provide a new and improved vibration isolator mount which is capable of attenuating vibrational displacements occurring relatively between a base and a supported load.

In view of the aforementioned need for a compact, low resonant frequency, vibration isolator mount, it is an additional object of this invention to provide a fluid mount utilizing a pair of communicating chambers, at least one of which is interposed between a base and a load, to obtain a large volume of fluid and a low resonant frequency while maintaining a low profile mount.

It is yet another object of this invention to provide a vibration isolator mount which automatically compensates for variations in the weight of a supported load to maintain the load at a constant equilibrium height.

A compact, vibration isolator mount illustrating certain principles of the invention may include a pair of fluid medium containing means. One of the containing means is interposed between a base and a load to support the load on the fluid medium confined within the containing means. The fluid medium confined within the pair of containing means is permitted to flow between the pair of containing means to increase the volume of the supporting fluid medium and thereby lower the resonant frequency of the fluid medium and also to dampen the vibration-induced flow of fluid between the pair of containing means.

DETAILED DESCRIPTION OF THE DRAWINGS

Figure 1:
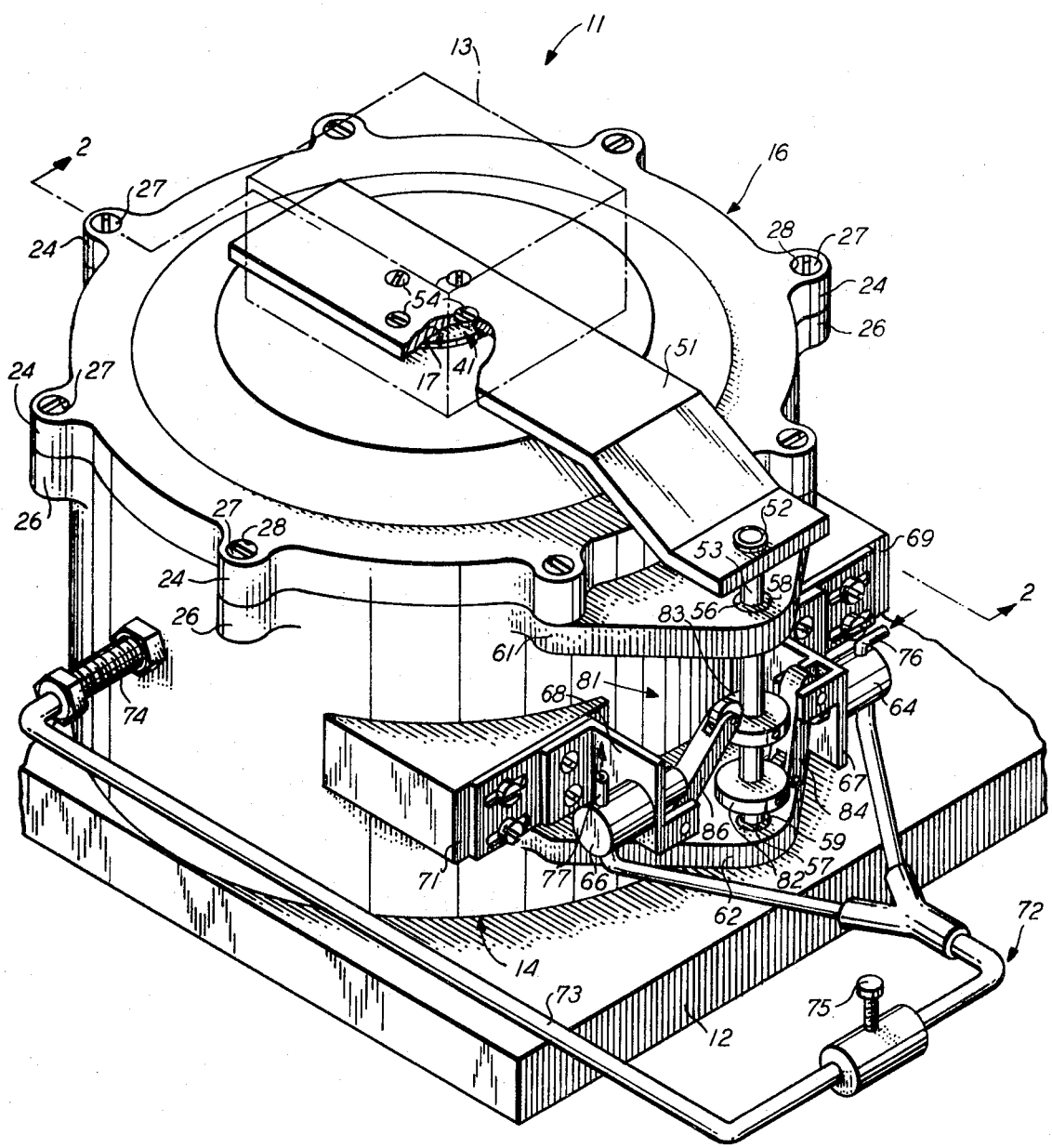
FIG. 1 is an isometric view showing a low-resonant frequency, vibration isolator fluid mount embodying certain principles of the present invention.
Figure 2:
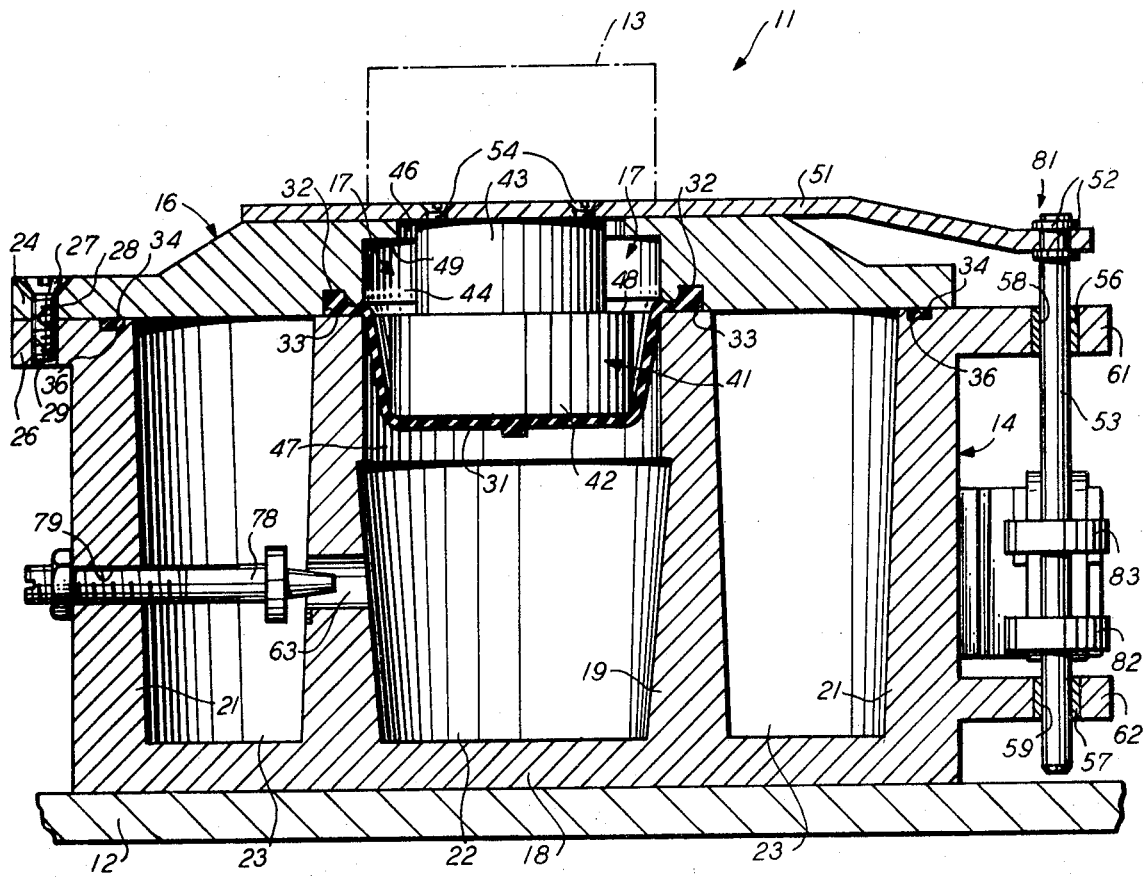
FIG. 2 is a cross-sectional view, taken along the lines 2—2 of FIG. 1, showing the arrangement of and cooperation among various elements of the low-resonant frequency, vibration isolator fluid mount.

Referring first to FIG. 1, there is shown one embodiment of a vibration isolator mount, designated generally by the numeral 11, constructed in accordance with the principles of the present invention. The mount 11 is interposed between a support surface of a base 12, such as a floor, and a load 13. Referring also to FIG. 2, the mount 11 includes a cylindrical housing, designated generally by the numeral 14, which is open at the top, and a circular housing cover, designated generally by the numeral 16. The cover 16 may be formed with a stepped opening, designated generally by the numeral 17.

As illustrated particularly in FIG. 2, the housing 14 has a closed bottom wall 18 abutting the support surface of the base 12 and cylindrical inner and outer side walls 19 and 21 which form concentric inner and outer chambers 22 and 23. A plurality of radially spaced flanges 24—24 are formed on the periphery of the cover 16 and correspond to a plurality of flanges 26—26 extending radially from the outer wall 21 of the housing 14. The cover 16 is mounted to the housing 14 by screws 27—27 extending through openings 28—28 formed in the flanges 24—24 and secured within threaded bores 29—29 formed in the flanges 26—26.

A resilient diaphragm 31 spans the open end of the inner chamber 22. The diaphragm 31 terminates in a rolled periphery 32 which is received by a circular groove 33 formed in the underside of the cover 16 to provide a seal between the upper edge of the inner wall 19 and the cover. The seal encloses the inner chamber 22 for receiving a volume of fluid medium such as air. An O-ring 34 located in a circumferential groove 36 formed in the upper edge of the outer wall 21 provides a seal between the outer wall and the cover 16 and, in conjunction with the cover and the seal provided by the rolled periphery 32 of the diaphragm 31, encloses the outer chamber 23 for receiving a volume of fluid medium such as air.

A stepped piston, designated generally by the numeral 41, abuts the diaphragm 31. Both the diaphragm 31 and the piston 41 are supported for vertical movement by the volumes of air contained within the chambers 22 and 23. The piston 41 is comprised of a lower section 42 and a smaller, upper section 43 which correspond to and are formed with slightly smaller diameters than a lower portion 44 and an upper portion 46, respectively, of the opening 17 of the cover 16. Also, an upper section 47 of the inner chamber 22 is formed with a diameter approximately equal to that of the lower portion 44. Thus, the lower section 42 of the piston 41 has freedom of vertical movement within a volume defined by the upper section 47 of the inner chamber 22 and the lower portion 44 of the opening 17 of the cover 16. The extent of upward vertical movement of the piston 41 is limited by contact between a shoulder 48 formed in the piston and a shoulder 49 formed in the opening 17 of the cover 16.

Referring now to FIGS. 1 and 2, there is shown a plate 51 which is interposed at a first end between the piston 41 and the load 13 and, at the opposite end, is affixed by ribs 52—52 to the upper end of a rod 53. The first end of the plate 51 is secured to the piston 41 by a plurality of screws 54—54 which extend through the stepped opening 17 of the cover 16. The rod 53 is mounted for free vertical reciprocation by a pair of bearings 56 and 57 fitted into bores 58 and 59, respectively, which are formed in flanges 61 and 62 extending from the housing 14. When the piston 41 and the load 13 move in an upward or downward direction, the plate 51 imparts like movement to the rod 53. The extent of downward movement of the plate 51, piston 41 and load 13 is limited by contact between the bottom surface of the plate and the top surface of the housing cover 16.

Referring further to FIG. 2, an aperture 63 is formed in and extends through the inner wall 19 of the housing 14 and communicates with the inner and outer chambers 22 and 23 to permit the flow of air in both directions between the chambers.

Referring again to FIG. 1, a pair of two-way inlet and exhaust valves 64 and 66 are secured by brackets 67 and 68, respectively, to projecting planar surfaces 69 and 71, respectively, formed on the housing 14. The inlet valve 64 and the exhaust valve 66 are coupled by a system of tubing, designated generally by the numeral 72. The system of tubing 72 includes a section 73 which is connected at one end to both the inlet valve 64 and the exhaust valve 66. The opposite end of the section 73 is secured by a valve 74 to a threaded bore (not shown) formed in the housing 14 to permit the flow of air between the inlet and exhaust valves 64 and 66 and the interior of the housing. A needle valve 75 is located in the section 73 of the tubing 72 for varying the flow of air through the tubing.

The inlet valve 64 is also connected to an external pressure line 76 which, in turn, is connected to a source of pressurized air (not shown). The exhaust valve 66 is provided with an exhaust line 77. When the exhuast valve 66 is in an unactuated, closed condition and the inlet valve 64 is in an actuated, open condition, air is admitted under pressure to the outer chamber 23 (FIG. 2) and, through the aperture 63 (FIG. 2), to the inner chamber 22 (FIG. 2). Conversely, when the inlet valve 64 is closed and the exhaust valve 66 is open, air is exhausted from the inner chamber 22 and from the outer chamber 23.

As mentioned previously, when the inlet valve 64 is open and the exhaust valve 66 is closed, air under pressure is admitted into the outer chamber 23 (FIG. 2) through valve 74, and a portion of that air passes through the aperture 63 (FIG. 2) into the inner chamber 22 (FIG. 2). The aperture 63, in permitting the flow of air in both directions between the chambers 22 and 23, couples the volumes of air contained therein. Thus, if the inlet valve 64 is now closed, two coupled volumes of air exerting equal pressure will be confined within the chambers.

Referring again to FIG. 2, with the load 13 positioned on the plate 51, the volumes of air confined within chambers 22 and 23 will support the piston 41 and the load 13 at an equilibrium height that is dependent upon the weight of the load and the pressure exerted by the confined air. In the event vibrational displacements are experienced by the base 12 or the load 13, the air confined within the chambers 22 and 23 functions as a vibration isolator, alternately expanding and contracting in response to the vibrational displacements to alternately store and release vibratory energy and thereby reduce the transmission of vibratory energy between the base 12 and the load 13. The use of the concentric outer chamber 23 which communicates with the inner chamber 22 increases the effective length and effective volume of the inner chamber, thus lowering the resonant frequency of the air contained therein and enhancing the isolation performance of the mount 11.

Another advantage of the concentric chamber design is its adaptability to a small diameter piston. In general, the resonant frequency of an air mount is proportional to the diameter or cross-sectional area of the piston. A piston which is small enough to provide a low resonant frequency might necessitate using a chamber of considerable length in order to provide a sufficiently large volume of supporting air. With the concentric chamber design, however, any decrease in the diameter of the piston 41 and the inner chamber 22 can be at least partially offset by a corresponding increase in the diameter and volume of the outer chamber 23.

The aperture 63, which provides communication between the inner chamber 22 and the outer chamber 23 by permitting the flow of air between the chambers, also constitutes a damping passageway for damping the flow of air and dissipating vibratory energy as heat. However, in general, the damping effect of such an aperture on the passage of air is inversely proportional to the cross-sectional area of the aperture, while the isolation performance of the volume of air confined within chambers 22 and 23 is directly proportional to the cross-sectional area of the aperture. Also, damping may increase the transmissibility of vibratory energy at non-resonance frequencies. The vibration isolator mount 11 utilizes a needle valve 78 which extends through a threaded bore 79 formed in the housing 14 and abuts the aperture 63. The needle valve 78 controls the passage of air between the chambers 22 and 23, permitting a compromise between isolation and damping performance and, thus, flexibility in the operation of the vibration isolator air mount 11.

As illustrated in FIG. 1, the vibration isolator air mount 11 includes a height control device, designated generally by the numeral 81, for supporting the load 13 at a predetermined equilibrium height above the base 12. The height control device 81 includes the plate 51, the rod 53, and a pair of circular cam plates 82 and 83 mounted at spaced positions on the rod 53. The device 81 further includes a pair of cam followers 84 and 86 which are mounted on the brackets 67 and 68 adjacent to the inlet and exhaust valves 64 and 66, respectively, for pivotal movement toward the valves.

In considering the operation of the height control device 81, assume that the weight of the load 13 which is being supported by the mount 11 and the pressure exerted by the air confined within the chambers 22 and 23 (FIG. 2) are initially such that the load is at equilibrium at a height which vertically centers the cam plates 82 and 83 between the cam followers 84 and 86. The spacing between the cam plates 82 and 83 is chosen such that a predetermined extent of downward or upward movement of the rod 53 and the cam plates is necessary for the cam plates to engage and pivot the cam followers 84 or 86.

If the weight of the load 13 is increased, for example, by the addition of workpieces to the load or by a machine operator leaning against the load for support, the equilibrium between load weight and air pressure is disturbed and the load, piston 41, plate 51, rod 53 and cam plates 82 and 83 move downwardly toward the base 12. If the increase in the weight of the supported load 13 and the corresponding downward movement of the rod 53 and cam plates 82 and 83 are sufficiently great, cam plate 82 will engage and pivot cam follower 84. Cam follower 84, in turn, will engage inlet valve 64 to open the valve and admit air into the chambers 22 and 23 (FIG. 2) of the mount 11 from the source of pressurized air. As the air pressure within the chambers 22 and 23 increases, the piston 41, plate 51, and load 13 are elevated, moving the rod 53 and cam plate 82 upwardly toward the equilibrium position. This upward movement continues until cam plate 82 disengages from cam follower 84 and the cam follower pivots from engagement with the inlet valve 64, allowing the valve to close to stop the ingress of air into the mount 11.

Conversely, if the magnitude of the load 13 is decreased sufficiently, the load, piston 41, plate 51, rod 53, and cam plates 82 and 83 move upwardly until the cam plate 83 pivots the cam follower 86 into engagement with the exhaust valve 66, opening the valve to exhaust air from the chambers 22 and 23 (FIG. 2). As the pressure within the chambers 22 and 23 decreases, the piston 41, plate 51 and load 13 are lowered toward the equilibrium position until the cam plate 83 disengages from the cam follower 86, allowing the cam follower to pivot from engagement with the exhuast valve 66 and the valve to close, terminating the egress of air from the chambers 22 and 23.

Figure 3:
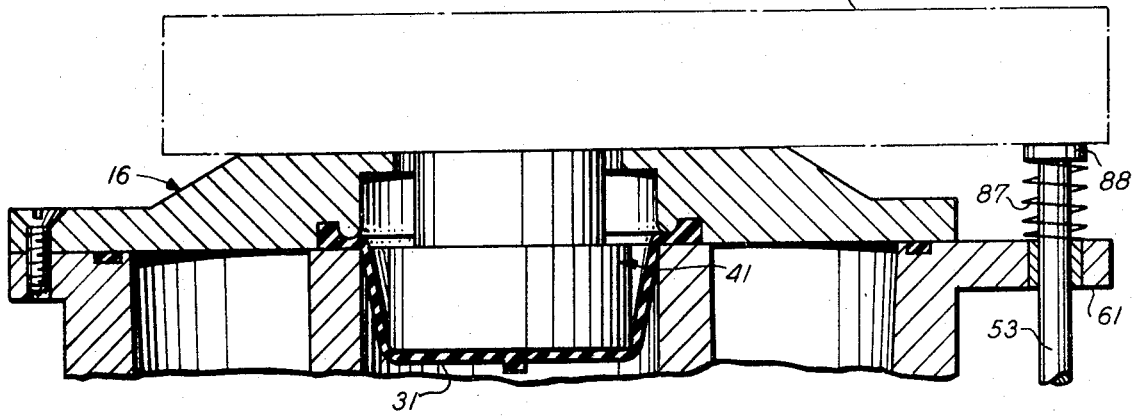
FIG. 3 is a partial sectional view of the mount as illustrated in FIG. 2 showing the supporting of a load larger than the load shown in FIG. 2.

As shown in FIG. 3, the plate 51 may be omitted when the load 13 is of sufficient dimension to extend over and rest upon the upper end of the rod 53. In this instance, a compression spring 87 is fitted over the rod 53 between the flange 61 and a head 88 to bias the rod in an upward direction.

Referring again to FIG. 1, the equilibrium position of the load 13 and the predetermined extent of movement from the equilibrium position necessary to actuate the height control device 81 may be adjusted by varying the mounting positions of the cam plates 82 and 83. In addition, it should be noted that if height changes were to be corrected very quickly, the load 13 might oscillate or "hunt" the equilibrium height. In the present invention, however, the needle valve 75 is used to control the ingress and egress rate of the air to thereby provide a correction rate which is sufficiently slow to preclude such oscillation. The rate of correction also precludes interference with the isolation performance of the vibration isolator air mount 11.

Referring again to FIG. 2 and summarizing the overall operation of the vibration isolator air mount 11, a load 13 is placed upon the plate 51 and air from the source of pressurized air is admitted through the inlet valve 64 (FIG. 1) into the outer chamber 23, and from the outer chamber through the aperture 63 into the inner chamber 22. When the pressure within the chambers is such that the piston 41 and the load 13 are supported at a height which positions the cam plates 82 and 83 between and disengaged from the cam followers 84 and 86 (FIG. 1), both the inlet valve 64 and the exhaust valve 66 (FIG. 1) are closed, thus establishing the equilibrium height for the load.

When vibratory displacements are experienced by the base 12 or the load 13, the air confined within the chambers 22 and 23 alternately contracts and expands, storing and releasing vibratory energy. In the case of vibratory displacements experienced by the base 12, the load 13 can't follow these vibratory displacements because the resonant frequency of the mount 11 is much lower than that of the disturbance. Thus, the load 13 is isolated from the disturbance. Also, the aperture 63 damps the vibration-induced flow of air between the chambers, dissipating vibratory energy as heat. The arrangement of the mount 11 provides resonant frequencies at least as low as 0.6 Hz and, thus, effective attenuation of disturbing frequencies as low as approximately 2 Hz.

Referring again to FIG. 1, a significant increase or decrease in the weight of the load 13 will cause a downward or upward movement, respectively, of the load sufficient to move either the cam plate 82 or the cam plate 83 into engaging and pivoting cam follower 84 or 86, respectively. In pivoting, the cam follower 84 or 86 will engage and actuate the inlet valve 64 or the exhaust valve 66. Actuation of the inlet valve 64 or the exhaust valve 66 admits air to or exhausts air from the chambers 22 and 23 (FIG. 2) to elevate or lower the piston 41, the load 13, the plate 51, and the rod 53 toward the equilibrium position. The cam plate 82 or 83 then disengages from cam follower 84 or 86, allowing the cam follower to pivot from engagement with valve 64 or 66 to close the valve and terminate the flow of air into or out of the chambers 22 and 23.

While the above-described vibration isolator air mount 11 utilizes concentric chambers 22 and 23, the principles involved are adaptable to other designs. For example, the air mount 11 might include a first air chamber which is interposed between the base 12 and the load 13 and a second, remotely located air chamber which is connected to the first chamber in accordance with the principles of this invention.

What is claimed is:

1. In a low-resonant frequency, vibration isolating, fluid medium mount for interposition between a load and a base for maintaining the load at a predetermined equilibrium height, which comprises:
   an inner chamber mounted on the base having an opening in one surface thereof;
   a flexible diaphragm positioned over said opening for sealing said inner chamber to provide an enclosure to confine a volume of fluid medium within said inner chamber;
   a piston abutting and supported by said diaphragm for supporting the load externally of said inner chamber and for causing oscillatory contraction and expansion of said confined volume of fluid medium in response to the vibrational displacement of the base to alternately store and release vibrational energy;
   an outer chamber positioned about said inner chamber;
   means interconnecting and communicating with said inner and outer chambers for effectively increasing the enclosure within which said volume of fluid medium is confined to lower the resonant frequency of said volume of fluid medium;
   said interconnecting means being of such size as to dampen the oscillation of said confined volume of fluid medium; and
   means responsive to changes in the magnitude of the load for admitting fluid medium to and exhausting fluid medium from said chambers to maintain a predetermined equilibrium height for said piston-supported load.

2. In the mount as recited in claim 1, which includes:
   means communicating with said fluid medium admitting and exhausting means for controlling the rate of ingress and egress of the fluid medium.

3. In a mount for interposition between a load and a base for isolating and damping vibrational displacements and for maintaining the load at a preset equilibrium height;
   a first chamber for receiving a volume of fluid medium having a closed bottom wall abutting the base and being formed with an upper wall having an opening therein;
   a second chamber for receiving a volume of fluid medium arranged about said first chamber;
   a flexible diaphragm over said opening in said first chamber and sealing said first chamber for enclosing a volume of fluid medium therein;
   load bearing means abutting said diaphragm for supporting the load externally of said first chamber on the volume of fluid medium enclosed within said first chamber to store vibratory energy generated by the load and the base, thereby reducing the transmission of vibratory energy, said load bearing means normally supporting the load at a preset equilibrium height from the base;
   a passageway communicating with and interconnecting said first and second chambers for effectively increasing said volume of supporting fluid medium to further decrease the transmission of vibratory energy and for dissipating vibratory energy as heat to damp vibrational displacements in the load and the base; and
   means for controlling the pressure exerted by the fluid medium to support the load at the preset equilibrium height.

4. The mount as set forth in claim 3, which includes:
   a needle valve positioned in said passageway for varying the communication between the volumes of fluid medium enclosed within said first and second chambers to alter the vibratory energy storing performance of the mount and to alter the damping effect of said passageway on vibrational displacements in the load and the base.

5. The mount as set forth in claim 3, wherein said pressure controlling means includes:
   means for admitting fluid medium to and exhausting fluid medium from said chambers;
   means for actuating said fluid medium admitting and exhausting means; and
   means actuated by a predetermined extent of movement of said load bearing means from the preset equilibrium height for operating said actuating means to admit fluid medium to or exhaust fluid medium from said chambers, depending upon the direction of movement of said load bearing means, to return the load to the equilibrium height.

6. The mount as set forth in claim 3, wherein said pressure controlling means includes:

first and second valves mounted adjacent to said second chamber for admitting fluid medium to and exhausting fluid medium from said first and second chambers;

a rod mounted adjacent to said second chamber for longitudinal movement away from and toward the base;

a plate mounted at a first end to said load bearing means and at the opposite end to said rod opposite the base for imparting like movement to said rod when said load bearing means is moved;

first and second cam followers pivotally mounted on said second chamber adjacent to said rod for engaging and actuating said first and second valves; and first and second cam plates mounted in spaced relationship on said rod for movement with said rod, whereupon, in response to changes in the magnitude of the supported load, a predetermined extent of movement of the load and said rod relative to the base from the preset equilibrium height causes said first or said second cam plate to engage and pivot said first or said second cam follower, whereafter said pivoting cam follower engages and actuates said first or said second valve to admit fluid medium to or exhaust fluid medium from said chambers to return said rod and the load to the preset equilibrium height.

7. A compact, low-resonant frequency, vibration isolating mount for interposition between a load and a base, which comprises:

a first cylindrical chamber having a closed bottom wall abutting the base and having an upper wall with an opening formed therein;

a flexible diaphragm positioned over and sealing said opening for providing a cylindrical enclosure to confine a volume of fluid medium to store vibratory energy from the base and the load, thereby reducing the transmission of vibratory energy;

a piston abutting said diaphragm and supporting the load externally of said first chamber for movement away from and toward the base;

a second cylindrical chamber arranged about said first chamber for confining a volume of fluid medium;

a passageway formed between said chambers for permitting the flow of fluid medium between said chambers to effectively increase the length of said cylindrical enclosure to further reduce the transmission of vibratory energy, said passageway being of such size as to dissipate stored vibratory energy as heat;

a valve positioned in said passageway for varying the flow of fluid medium between said chambers to adjust the vibratory energy dissipation of said passageway and the effect of said passageway on the transmission of vibratory energy;

first and second valves mounted adjacent to said second chamber for admitting fluid medium to and exhausting fluid medium from said chambers;

a rod mounted adjacent to said second chamber for longitudinal movement away from and toward the base;

plate means mounted at a first portion thereof to the rod opposite the base and at a second portion thereof, spaced from said first portion, to said piston for imparting movement of the load and said piston to said rod;

first and second cam followers pivotally mounted on said second chamber adjacent to said rod for engaging and actuating said valves; and first and second cam plates mounted in spaced relationship on said rod for movement with said rod, whereupon, in response to changes in the magnitude of the supported load, a predetermined extent of movement of the load and said rod relative to said base from a preset position causes said first or said second cam plate to engage and pivot said first or said second cam follower, whereafter said pivoting cam follower engages and actuates said first or said second valve to admit fluid medium to or exhaust fluid medium from said chambers and return said rod and the load to the preset position.

* * * * *